United States Patent
Gutzmann

(10) Patent No.: US 10,994,360 B2
(45) Date of Patent: May 4, 2021

(54) APPARATUS FOR FEEDING WELDING WIRE AND PROCESS GAS TO A WELDING DEVICE

(71) Applicant: Alexander Binzel Schweisstechnik GmbH & Co. KG, Buseck (DE)

(72) Inventor: Jörg Gutzmann, Kirchhain (DE)

(73) Assignee: ALEXANDER BINZEL SCHWEISSTECHNIK GMBH & CO. KG, Buseck (DE)

( * ) Notice: Subject to any disclaimer, the term of this patent is extended or adjusted under 35 U.S.C. 154(b) by 350 days.

(21) Appl. No.: 15/532,538

(22) PCT Filed: Dec. 3, 2015

(86) PCT No.: PCT/EP2015/078455
§ 371 (c)(1),
(2) Date: Jun. 2, 2017

(87) PCT Pub. No.: WO2016/096450
PCT Pub. Date: Jun. 23, 2016

(65) Prior Publication Data
US 2018/0021875 A1    Jan. 25, 2018

(30) Foreign Application Priority Data

Dec. 18, 2014   (DE) ..................... 10 2014 118 970.1

(51) Int. Cl.
*B23K 9/16*    (2006.01)
*B23K 9/173*   (2006.01)
*B23K 9/29*    (2006.01)

(52) U.S. Cl.
CPC .............. *B23K 9/164* (2013.01); *B23K 9/173* (2013.01); *B23K 9/295* (2013.01)

(58) Field of Classification Search
CPC ........ B23K 9/164; B23K 9/173; B23K 9/295; B23K 9/28
(Continued)

(56) References Cited

U.S. PATENT DOCUMENTS 3,283,121 A    11/1966  Bernard et al.
3,659,076 A *   4/1972  Ogden, Sr. ............. B23K 9/295
                                                 219/137.42
(Continued)

FOREIGN PATENT DOCUMENTS

DE       3432087      3/1985
DE    202008011356    3/2009
(Continued)

OTHER PUBLICATIONS

International Search Report and Written Opinion from PCT/EP2015/078455 dated Mar. 11, 2016.
(Continued)

*Primary Examiner* — Robert J Utama
*Assistant Examiner* — Ayub A Maye
(74) *Attorney, Agent, or Firm* — Warner Norcross + Judd LLP

(57) ABSTRACT

The invention relates to an apparatus for feeding welding wire and process gas to a welding device comprising a wire feeding nozzle (1), which has a welding wire channel (4), a nozzle block (2), which is releasably connected to the wire feeding nozzle (1), a profile (3), which is releasably or fixedly connected to the nozzle block (2), has a welding wire channel (6) and can be connected to a welding wire conveying device, wherein the process gas channel (9) of the process gas feeding device is arranged at least partially within the profile (3) and the nozzle block (2) is provided with multiple bores (7), which adjoin the process has channel (9) and are arranged parallel to or at an acute angel of ±5°

(Continued)

to the welding wire chancel (4) of the wire feeding nozzle (1) and around the wire feeding nozzle (1). In this case, the nozzle block (2) is formed cylindrically in the direction of an end (14) having the wire feeding nozzle (1), wherein the bores (7) arranged within the nozzle block run out into depressions (15) on the surface of the nozzle block (2).

11 Claims, 3 Drawing Sheets

(58) Field of Classification Search
USPC ..... 219/136, 137.41, 137.42, 137.43, 137.61
See application file for complete search history.

(56) References Cited

U.S. PATENT DOCUMENTS

| | | | |
|---|---|---|---|
| 3,803,281 A | 4/1974 | Bernard et al. | |
| 4,158,763 A * | 6/1979 | Moerke | B23K 9/295 219/137.42 |
| 4,529,863 A | 7/1985 | Lebel | |
| 5,313,046 A | 5/1994 | Zamuner | |
| 5,811,055 A * | 9/1998 | Geiger | B23K 9/0061 266/48 |
| 6,209,886 B1 * | 4/2001 | Estes | A61B 17/162 279/143 |
| 6,403,915 B1 * | 6/2002 | Cook | H05H 1/28 219/121.51 |
| 6,924,461 B2 * | 8/2005 | Matiash | B23K 9/323 219/137.42 |
| 8,552,341 B2 * | 10/2013 | Zamuner | B23K 9/123 219/137.31 |
| 9,527,155 B2 * | 12/2016 | Meess | B23K 9/173 |
| 9,560,732 B2 * | 1/2017 | Shipulski | B23K 10/00 |
| 9,833,859 B2 * | 12/2017 | Kachline | B23K 9/173 |
| 2004/0026394 A1 * | 2/2004 | Giese | B23K 9/295 219/137.42 |
| 2010/0133240 A1 * | 6/2010 | Takahashi | B23K 9/173 219/74 |
| 2013/0313241 A1 * | 11/2013 | Zander | B23K 9/173 219/137.62 |
| 2014/0319103 A1 | 10/2014 | Stabb et al. | |
| 2015/0273616 A1 * | 10/2015 | Cooper | B23K 9/173 219/137.42 |

FOREIGN PATENT DOCUMENTS

| | | |
|---|---|---|
| EP | 2556913 | 2/2013 |
| JP | S57152386 | 9/1982 |
| JP | S560382498 | 9/1982 |
| JP | S6072679 | 4/1985 |
| NL | 1039363 | 8/2013 |

OTHER PUBLICATIONS

English Translation of the International Preliminary Report on Patentability dated Jun. 29, 2017 from PCT/EP2015/078455.

* cited by examiner

APPARATUS FOR FEEDING WELDING WIRE AND PROCESS GAS TO A WELDING DEVICE

BACKGROUND

The invention involves an apparatus for feeding welding wire and process gas to a welding device.

Such pieces of apparatus for feeding welding wire and process gas to a welding device of many kinds and types are already known. As a rule, they have a wire feeding nozzle with a welding wire channel, whereby the wire feeding nozzle is attached to a detachable nozzle block. The nozzle block is in turn connected to a detachable tube, which is provided with a welding wire channel and connected to a welding wire movement apparatus. In addition, such pieces of apparatus have a process gas feeding device, which as a rule has at least one process gas channel, whereby this process gas feeding device is connected to a process gas reservoir. As a rule, thereby the process gas feeding device is provided with a gas nozzle, which is placed over the nozzle block so that the process gas discharges directly through the nozzle block. The process gas serves essentially to blow away the welding gas that occurs during welding. If an inert gas is used as a process gas, a protective gas bell is formed by the process gas so that very good welding results are achievable.

A welding device is known from JP-H01-095887 A, in which the welding wire feeding nozzle is provided with eight boreholes, which are set concentrically around the welding wire channel. The process gas is directed through these boreholes to the welding spot or to the welding area. It is true that with such a gas feed, process gas can be blown concentrically around the welding wire during the welding process, so that the welding wire has process gas streaming around it over its entire length during the welding process, and any possibly arising welding smoke can be effectively blown away by this process gas. To be sure, it is technically demanding to provide wire feeding nozzles made as replaceable parts with such boreholes for process gas feeding. Therefore, in order for the wire feed nozzle to have very low down time in comparison to the welding device, many such wire feeding nozzles must be manufactured and stocked for the operation of the welding device. It should thereby be observed that not only is the manufacture of such wire feed nozzles with boreholes for gas feed technically demanding, but an increased expenditure for energy and support costs is necessary, so that as a result an unsatisfactory balance exists both from an ecological and a business point of view. In addition, during the welding process, the gas feed is already subject to very high temperatures during the feed because of the heated wire feeding nozzle, and as a result the homogeneity of the gas feed into the welding area or to the welding spot is not optimal because of the process gas streams that may occur due to the high temperature of the wire feeding nozzle.

Moreover, from U.S. Pat. No. 5,313,046 a device for feeding welding wire and process gas to a welding device is known, which however also cannot assure a satisfactorily homogeneous feed of process gas, since non-homogeneous effects cannot be avoided that are the result of the arrangement there for the boreholes that feed the process gas.

SUMMARY

It is therefore the task of the invention to make available a device for feeding welding wire and process gas to a welding device with which a homogeneous feed of the process gas around the welding wire to the welding spot or welding area is made possible, whereby the manufacture and operation of the welding device is also optimized from an ecological and business point of view.

The device according to the invention for feeding welding wire and process gas to a welding device has a wire feeding nozzle with a welding wire channel and a detachable nozzle block attached. In addition, the device is provided with a nozzle block that is detachable or attached permanently and a tube that is attachable to a welding wire feed device. Moreover, the device according to the invention has a process gas feeding device, whereby the process gas feeding device is attachable to a process gas reservoir. The device according to the invention is distinguished in that the process gas channel of the process gas feed device is arranged at least partially within the tube, and the nozzle stock is provided with several boreholes attaching it to the process gas channel, which are arranged parallel or at an acute angle of ±5° to the welding wire channel of the feed wire nozzle and around the feed wire nozzle. The process gas channel of the process gas feeding device should not necessarily be understood as a single channel, but as several single channels, which however pass on the process gas to the boreholes arranged in the nozzle block. In order also to make possible the most homogeneous spread of the process gas around the welding wire in the area of the welding spot or the welding area, it is planned that the nozzle stock be formed cylindrically with an end pointing in the direction of the nozzle feed device, whereby the boreholes arranged inside the nozzle block run in recesses on the surface of the nozzle block. It is hereby achieved that the process gas can be distributed homogeneously around the nozzle block onto the wire feed nozzle even before flowing out, and does not flow out for the first time directly out of the nozzle block in front of the wire feeding nozzle.

Thereby it is also shown to be advantageous that the recesses are formed in a cross-section perpendicular to the longitudinal axis of the nozzle block, whereby the radius of the circle segments corresponds to the radius of the boreholes. In addition, the homogeneity of the process gas around the welding wire in the area of the welding spot or around the welding area is once again assured in a specific way, whereby such recesses can be made technically simply and safely with known manufacturing procedures.

Through the formation of the device according to the invention, the process gas feed to the welding spot or to the welding area is not arranged on or within the wire feed nozzle, and as a result the process gas during welding is not unnecessarily heated before reaching the welding spot or the welding area by the wire feeding nozzle, which functions at a higher temperature. Hereby thermally dependent streams of the process gas are minimized, and as a result the process gas can be fed particularly homogeneously around the welding wire at the welding spot or at the welding area. Thereby it has been shown that very good results are achieved in the welded joint.

Advantageously, the recesses on the surface of the cylindrical end of the nozzle block run from the openings of the boreholes within the nozzle block over the entire length of the cylindrical end. Thereby the cross-section of the recesses can be constant over the entire length. To be sure, it is also possible that the cross-section of the recesses moving away from the boreholes is reduced or enlarged in size. In any case, it is thereby assured that the process gas within these recesses is fed further after leaving these boreholes, while at the same time an equal and homogeneous distribution of the process gas above these recesses takes place around the nozzle block. Hereby the process gas is fed distributed especially homogeneously around the welding wire onto the welding spot or the welding area.

In order to make possible an especially homogeneous or equal feed of the process gas around the welding wire onto the welding spot or welding area, it has been shown to be advantageous that the boreholes within the nozzle block are arranged running in a circle or an ellipse concentrically or elliptically to the welding wire channel of the wire feeding nozzle.

Furthermore, in another embodiment of the invention it has been shown to be useful for a pedestal to be planned that has a process channel and a wire feeding channel in which the tube is received and that has connection elements for a welding wire movement apparatus and a process gas reservoir. This embodiment makes it possible to implement the invention in all possible welding processes, since the welding devices used there merely must have corresponding connection elements so that the device according to the invention can be connected. So that no unintended streams of process gas caused by high temperatures have a disturbing effect in the welding area, it has also been shown to be advantageous that the process gas channel of the tube and the connected boreholes of the nozzle block stand connected to each other across from the environment with thick process gas.

Hereby an undesired emission of process gas is avoided. The process gas can therefore be discharged from the device according to the invention only through the boreholes of the nozzle block. In this way, the continuous homogeneity of the process gas at the welding spot or the welding area is assured.

According to another idea for the invention, the tube is thereby formed as a tube pipe. Tubes formed in this way as a tube pipe can be connected simply with the other parts of the device according to the invention. In addition, with such tube pipes it is possibly simply to arrange therein process gas channels and wire feeding channels.

In order that the process gas may spread around the welding wire equally, according to the invention it is further planned that the nozzle block have at least three, preferentially six, and especially preferentially eight boreholes, which preferentially all have the same radius.

Thereby the embodiment of the invention also moves in the same direction in which the boreholes are arranged in rotation symmetrically around the longitudinal axis of the nozzle block. Rotation symmetrically is hereby understood to mean that when the nozzle block rotates around a specific angle of the boreholes, it comes to rest again flat with the cover. So in the case of three boreholes, these would be in each case set at 120° toward each other, while with four boreholes this would be at 90°, with six boreholes at 60°, and with eight boreholes, at 45°.

Finally, another welding device, in particular a laser welding and/or soldering device, could be protected with the device according to one of the prior claims.

Other goals, advantages, features, and application possibilities of this invention result from the following description of the examples of embodiments according to the figures. Thereby all the features that are described and/or presented in pictures form in themselves or in any reasonable combination the object of this invention, even independent of their summary in the claims or in related claims.

BRIEF DESCRIPTION OF THE DRAWINGS

The figures show.

DESCRIPTION OF THE CURRENT EMBODIMENT

Figure 1:
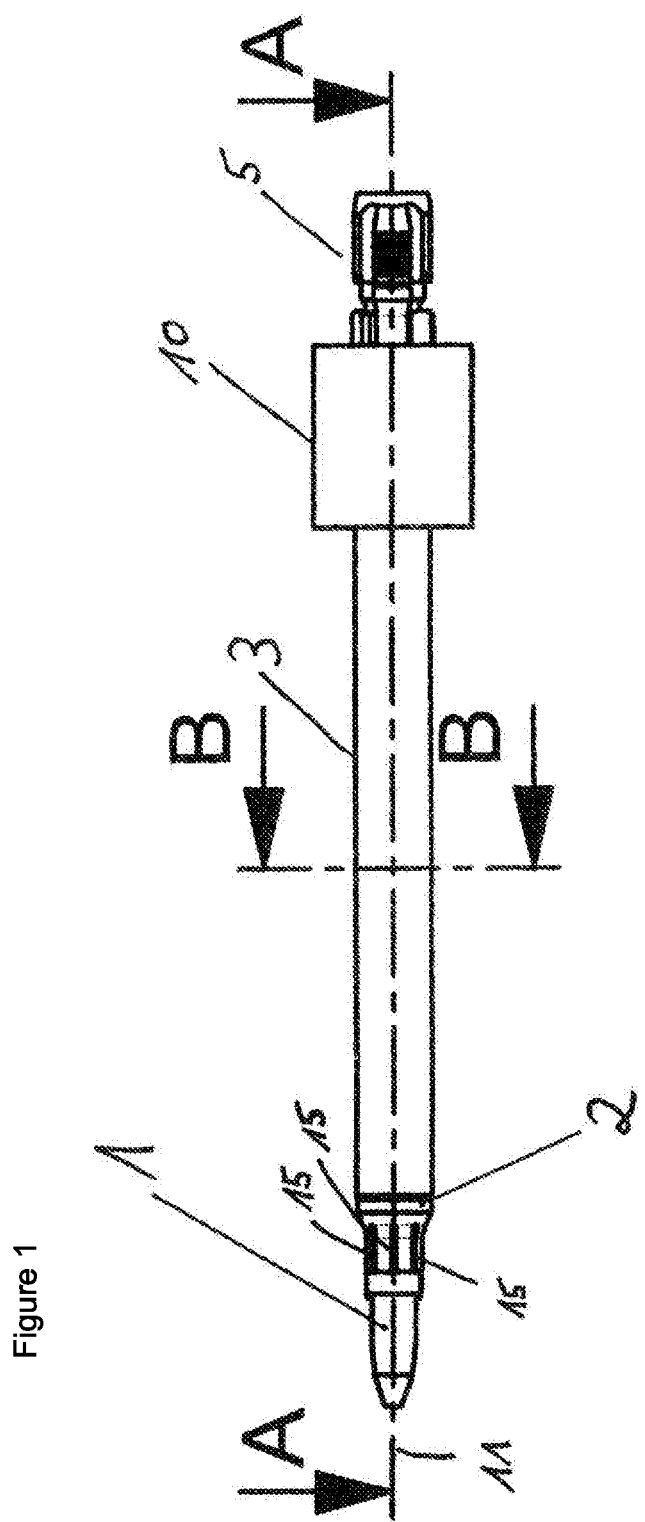
FIG. 1: an example of an embodiment of a device according to the invention in a top-down view.
Figure 2:
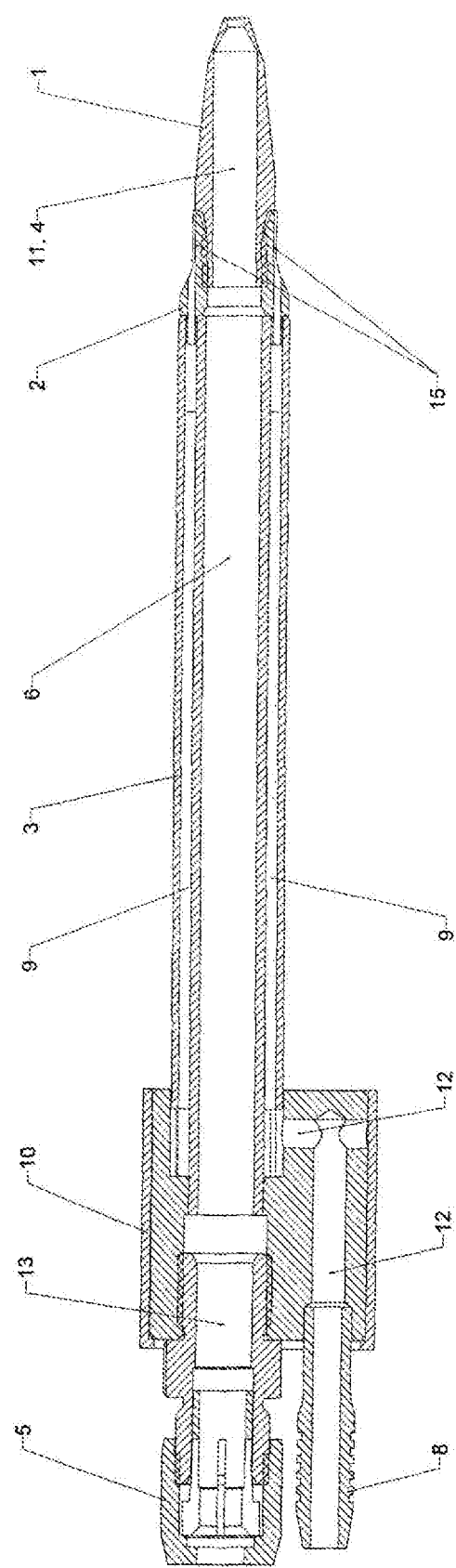
FIG. 2: the example of an embodiment of FIG. 1 in a cross-section view along the A-A slice level of FIG. 1,
FIG. 3: the example of an embodiment of FIG. 1 in a cross-section view along the B-B slice level of FIG. 1,
FIG. 4: the nozzle block of the example of the embodiment of FIG. 1 in a partial sectional view.
Figure 3:
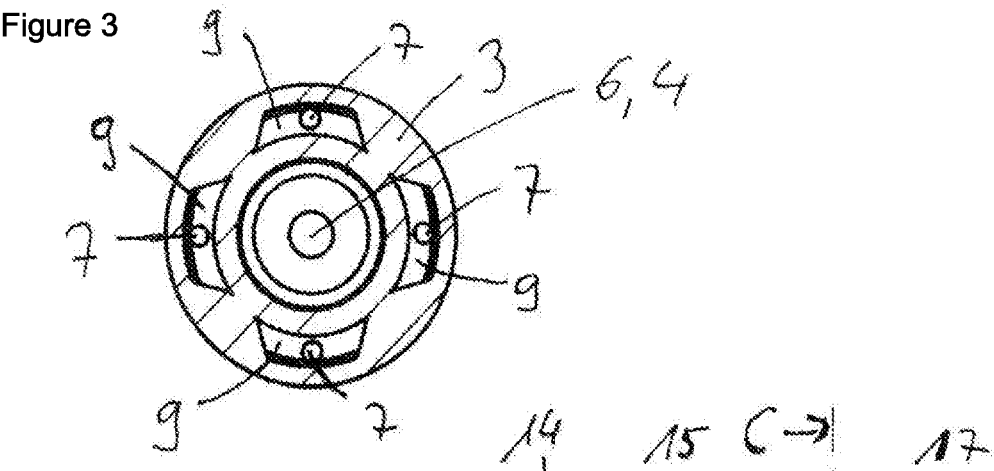

Various views are shown in FIGS. 1 to 3 of an example of an embodiment of a device according to the invention for feeding welding wire and process gas to a welding device. The essential elements of the device are thereby especially well recognizable in FIG. 1, while in FIGS. 2 and 3 the construction of the individual elements themselves is clarified.

The device for feeding welding wire and process gas to a welding device has a tube 3 set up as a tube pipe, which on one side is connected to a pedestal 10, whose connection elements 5 and 8 connect the device to a welding wire movement apparatus and a process gas reservoir. On the other side, the tube 3 set up as a tube pipe on its other end has a nozzle block 2 in which a wire feeding nozzle 1 is placed.

As seen in particular in FIG. 2, the pedestal 10 is provided with a process gas channel 12, which stretches on one side to the connection element 8 for the process gas reservoir 8, and on the other side to process gas channels 9 of the tube 3 set up as a tube pipe.

Furthermore, the pedestal 10 has a wire feeding channel 13, which is arranged on one end with the connection element 5 for the wire feeding device and on the other end with a wire feeding channel 6 of the tube 3 set up as a tube pipe on a longitudinal axis 11 of the entire device. The tube 3 set up as a tube pipe has on the end opposite the pedestal 10 an opening, on which the nozzle block 2 is arranged with a connection element 17.

The nozzle block 2 is provided with an opening 16, in which the wire feeding nozzle 1 of the device is arranged. The wire feeding nozzle 1 has a welding wire channel 4, and as a result the welding wire can be fed from the wire feeding device via the connection element 5 for the wire feeding device and the wire feeding channel 13 of the pedestal 10, and the wire feeding channel 6 of the tube pipe 3 can be fed into the welding wire channel 4 of the wire feeding nozzle 1. The welding wire comes out of the welding wire channel 4 of the wire feeding nozzle 1, and with an appropriate input of energy to the welding device can form a welding seam to connect the elements to be welded to each other.

During the welding process, process gas is applied to the welding spot or the welding area from a process gas reservoir via the connection element 8 for the process gas reservoir, the process gas channel 12 of the pedestal 10, the process gas channels 9 of the tube 3 set up as a tube pipe, and boreholes 7 of the process block 2.

Thereby one may clearly see from the sectional view of FIG. 3 that the process gas channels 9 of the tube pipe 3 stand in effective contact with the boreholes 7 of the nozzle block 2. In FIG. 3, to be sure, only four boreholes 7 of the nozzle block 2 are recognizable through the four process gas channels 9 of the tube 3.

Figure 5:
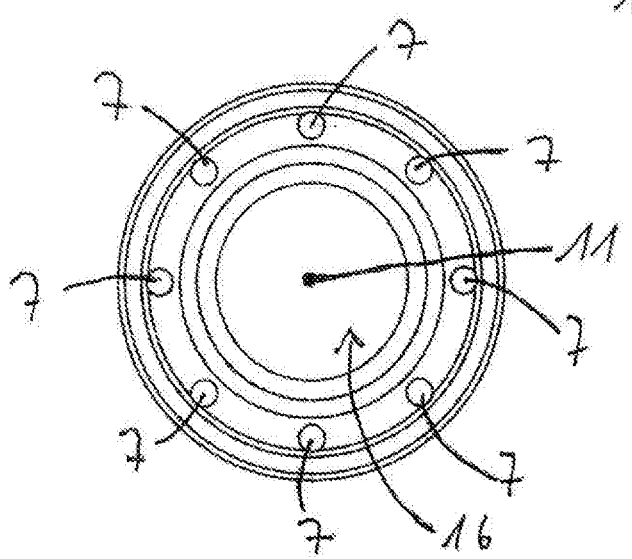
FIG. 5: the nozzle block according to FIG. 4 in a sectional view along the slice level C-C of FIG. 4.

However, as may be seen in particular in FIG. 5, the nozzle block 2 in this example of embodiment also has eight boreholes 7 arranged concentrically around the longitudinal axis 11. The process gas channels 9 of the tube 3 are thereby set up in such a way that they can provide process gas to all eight boreholes 7 in nozzle block 2 in the connection area of the connection element 17 of the nozzle block 2.

Figure 4:
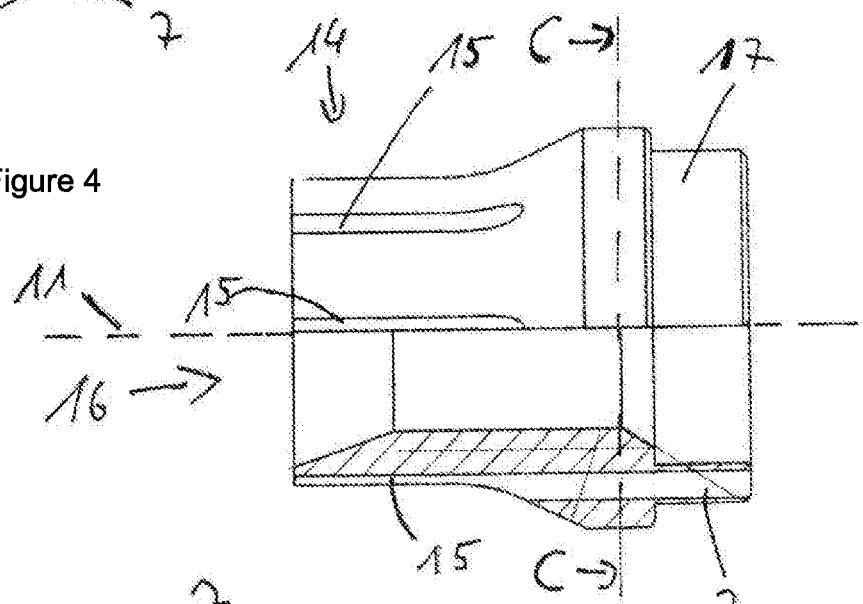

FIG. 4 shows the nozzle block 2 of the device in a partial section view. In particular one may recognize here clearly that the nozzle block 2 is formed cylindrically in the direction of the end of 14 having a wire feeding nozzle 1, whereby the boreholes 7 in the nozzle block 2 discharge in recesses 15 on the surface of the nozzle block 2. The recesses 15 on the surface of the cylindrical end 14 of the nozzle block 2 thereby run from the openings of the boreholes 7 within the nozzle block 2 over the entire length of the cylindrical end 14. Thereby the cross-section of the recesses 15 in this example of an embodiment runs consistently over their entire length. To be sure, in other examples of embodiments not illustrated here it is possible that the openings from the boreholes 7 in this cross-section run reduced or enlarged, but in any case it is thereby assured that the process gas within these recesses 15 is fed further after leaving the boreholes, while at the same time an equal and homogeneous distribution of the process gas around the nozzle block 2 takes place above these recesses 15. Hereby the process gas is fed distributed especially homogeneously around the welding wire onto the welding spot or the welding area.

It is further to be recognized that the boreholes 7 run parallel to the welding wire channel 4 of the wire feeding nozzle 1. As is to be seen in particular in FIGS. 1 and 2, the welding wire channel 4 of the wire feeding nozzle 1 lies exactly on the longitudinal axis 11 of the device or of the nozzle block 2. To be sure it is also possible that in another example of an embodiment not shown here the boreholes 7 are arranged around the welding wire channel 4 of the wire feeding nozzle 1 at an acute angle.

The process gas is fed in particular homogeneously around the welding wire during the welding at the welding spot or the welding area through the process gas feeding channels 9 and 12 due to the symmetrically rotated and concentric arrangement of the boreholes 7 of the nozzle block 2, and thereby also of the recesses 15. It hereby results that during the welding process especially homogeneous process gas relations result at the welding spot or the welding area, so that as a result especially good welding properties of the welding seam can be created.

LIST OF REFERENCES 1 wire feeding nozzle
2 nozzle block
3 tube
4 welding wire channel
5 connection element
6 welding wire channel
7 borehole
8 connection element
9 process gas channel
10 pedestal
11 longitudinal axis
12 process gas channel
13 wire feeding channel
14 end
15 recess
16 opening
17 connection element
A-A slice
B-B slice
C-C slice

The invention claimed is:

1. An apparatus for feeding welding wire and process gas to a welding device comprising:
a tube including a tube wall defining a central welding wire channel, the tube wall defining tube process gas channels each within the tube wall, whereby the tube process gas channels are separate from the central welding wire channel;
a nozzle block connected to the tube, the nozzle block including a nozzle block wall including boreholes within the nozzle block wall, each of the boreholes having an opening, the boreholes communicating with the tube process gas channels, the nozzle block being cylindrical and having a nozzle block circumference, the nozzle block having a nozzle block end including a surface defining recesses and having a length, the recesses being located around the nozzle block circumference, the recesses extending from the boreholes along the length of the nozzle block end, the recesses communicating with the boreholes, whereby process gas exiting the boreholes flows through the recesses on the surface of the nozzle block end, the recesses being semi-circular in cross-section perpendicular to a longitudinal axis of the nozzle block, each of the recesses having a recess radius, each of the boreholes having a borehole recess having a borehole radius, the recess radius corresponding to the borehole radius; and
a wire feeding nozzle connected to the nozzle block end, the wire feeding nozzle defining a central nozzle welding wire channel communicating with the central welding wire channel.

2. The apparatus according to claim 1, wherein the boreholes are arranged in at least one of a circle or an ellipse concentric with the central welding wire channel.

3. The apparatus according to claim 1, further comprising a pedestal adapted to be connected to a welding wire movement apparatus and to a process gas feeding device, the pedestal defining a pedestal process gas channel for conveying process gas from the process gas feeding device, the pedestal defining a wire feeding channel; and wherein the tube process gas channels communicate with the pedestal process gas channel.

4. The apparatus according to claim 1, wherein the nozzle block includes—at least three boreholes all having the same radius.

5. The apparatus according to claim 4, wherein the boreholes are arranged in symmetrical rotation around a longitudinal axis of the nozzle block.

6. A laser welding device having an apparatus according to claim 1.

7. The apparatus according to claim 4, wherein the nozzle block includes at least six boreholes.

8. The apparatus according to claim 7, wherein the nozzle block includes at least eight boreholes.

9. A soldering device having an apparatus according to claim 1.

10. A The apparatus according to claim 1, wherein the boreholes are parallel or at an acute angle of +/−5° to the nozzle welding wire channel.

11. The apparatus according to claim 1, wherein:
the tube is formed as a tube pipe; and
the process gas channels and the wire feeding channel being arranged in the tube pipe.

* * * * *